US00RE33916E

United States Patent [19]

Saenz et al.

[11] E Patent Number: Re. 33,916

[45] Reissued Date of Patent: May 5, 1992

[54] DIGITAL DISPLAY SYSTEM

[75] Inventors: Jesus A. Saenz, Greenwich, Conn.; Paul S. Yosim; Darwin P. Rackley, both of Boca Raton, Fla.

[73] Assignee: International Business Machines Corporation, Armonk, N.Y.

[21] Appl. No.: 443,187

[22] Filed: Nov. 30, 1989

Related U.S. Patent Documents

Reissue of:

[64] Patent No.: 4,727,362
Issued: Feb. 23, 1988
Appl. No.: 631,043
Filed: Jul. 16, 1984

[51] Int. Cl.[5] ..... G09G 1/16

[52] U.S. Cl. ..... 340/703; 340/814; 358/148

[58] Field of Search ..... 340/701, 703, 731, 728, 340/814; 358/140, 148-153; 315/399

[56] References Cited

U.S. PATENT DOCUMENTS 4,121,283 10/1978 Walker .
4,276,565 6/1981 Dalton et al. .
4,349,839 9/1982 McGinn .
4,408,200 10/1983 Bradley .
4,453,183 6/1984 Balaban et al. .
4,521,802 6/1985 Ikeda .
4,574,279 3/1986 Roberts .
4,583,119 4/1986 Roscoe .

FOREIGN PATENT DOCUMENTS 4798 10/1979 European Pat. Off. .
1500970 11/1967 France .
1188294 4/1970 United Kingdom .

*Primary Examiner*—Jeffery A. Brier
*Attorney, Agent, or Firm*—Richard A. Tomlin

[57] ABSTRACT

A digital display system includes a monitor arranged to receive digital display data and synchronizing signals to develop displays on a cathode ray tube. The monitor is switched between different line structure and/or color definition modes in response to the polarity of one of the vertical or horizontal synchronizing signals trains. A circuit receives this train to provide control signals to the horizontal time base and/or a color signal code converter. The time base control signal, in accordance with its binary value, controls the frequency of the time base. The color converter, in response to the control signals, either passes color signals received in parallel over six input lines without change to the cathode ray tube drive circuits or converts color signals on four of the input lines to output signals on the six lines to the drive circuits.

17 Claims, 2 Drawing Sheets

DIGITAL DISPLAY SYSTEM

Matter enclosed in heavy brackets [ ] appears in the original patent but forms no part of this reissue specification; matter printed in italics indicates the additions made by reissue.

DESCRIPTION

1. Field of the Invention

This invention relates to digital display systems, and in particular to such display systems employing a raster scanned cathode ray tube. More particularly, the present invention relates to such a display system which performs automatic mode switching.

2. Description of the Prior Art

The primary use of raster scanned cathode ray tubes has been in the television field. However, over the last decade, such raster scanning has found increasing uses in the computer display field. At the present time, an overwhelming majority of computer systems use such displays for communicating instructions and results to the operator.

In both television and computer display, many modes of operation have been used and proposed. In television, for example, modes of operation with raster line structures of 405, 525, 625 and 805 lines have been used. In both Britain and France, different television transmitters still generate signals using different line structures, 405 and 625 in Britain, and 805 and 625 in France. In both of these countries, at least up to a few years ago, receivers were provided with manual switching arrangements to alter the horizontal time base frequency when switching between high and low line definition channels. Some attempts were made to provide automatic switching of the time base frequency based on the incoming signals, as is illustrated in British patent No. 1,188,294. In that patent, the horizontal synchronizing signals are applied to a circuit which is tuned to the frequency of these signals for one line definition standard (e.g. 405 lines). The circuit therefore, provides different outputs in accordance with the different line structures required by the input signals, and these outputs are used to drive relays to switch the horizontal time base to corresponding frequencies.

A similar, but more complex arrangement is employed in the computer video display device described in published European patent application No. 4798. In that arrangement, the video display device is adapted to operate on different line standards in accordance with received video data. A phase locked loop tone generator which receives the composite video signal is tuned to the line frequency of one of the line standards. Accordingly, it provides different outputs in accordance with the line standard indicated by the video signal. These outputs are used to switch the horizontal time base frequency.

The present invention is based on the realization that in a digital display system in which signals for the display are developed in a computer system, the polarity of the synch signals can be selected at will. Consequently, switching of the display monitor can be achieved by reference to the polarity of at least one of the synch signals. Note that in embodiments of the invention described hereinafter, the synch signals are defined as being of one polarity when each synch pulse comprises a rise from a given reference level to a higher level, and of the opposite polarity when each synch pulse comprises a drop from said highest level to the reference level. Thus, if the digital signals generated by the computer are for a first data format, at least one of the synch signal trains, for example the vertical synch signals, is of one polarity, and if the computer signals are for a different format these synch signals are of the opposite polarity. The circuits which detect the polarity to provide the switching functions in the monitor, as they do not use tuned circuits, are simpler and more reliable than those of the prior art arrangements. In addition, the formats to be switched may be either the scanning frequencies and/or the video signal format.

DISCLOSURE OF THE INVENTION

The present invention relates to a digital display system including digital data processing means operable to develop a data set for display, and a monitor device, including a raster scanned cathode ray tube and video drive means responsive to said data set to generate a display on the cathode ray tube, in which the data processing means is further operable to generate a series of synchronizing signals of polarity related to the format of said data set and the monitor device includes circuit means responsive to the polarity of said synchronizing signals to switch the raster scanning means of the monitor to correctly display a received data set.

DETAILED DESCRIPTION OF THE INVENTION

Figure 1:
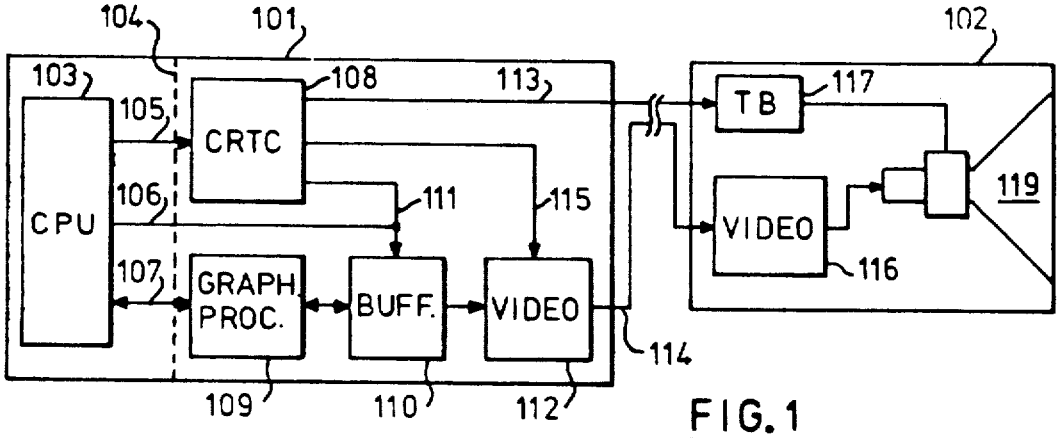
FIG. 1 is a block diagram of a display system including a display adapter coupled to a computer and a display monitor.

FIG. 1 is a block diagram of a known digital data display arrangement comprising a microcomputer 101 coupled to a display monitor 102. The microcomputer is shown in highly simplified form and comprises a central processing unit 103 coupled to a display adapter which comprises the components to the right of broken line 104. The display adapter comprises a programmable CRT controller 108, a graphics processor 109, a buffer store 110, and a video processor 112. The CRT controller 108 is responsive to tuning and control signals from CPU 103 on a bus 105 to generate synch signals on a bus 113, address signals for buffer 110 on a bus 111 and control signals for video processor 112 on a bus 115. CPU 103 also provides address signals for the buffer 110 over a bus 106. Output digital signals from video processor 112 are applied over a bus 114 to video circuits 116 in the display monitor which, in response to these signals, generate the color drive signals for a CRT 119. The synch signals from the CRT controller 108 on bus 113 are used to drive time base generators 117 which provides signals for the deflection coils of CRT 119 in a known manner.

In operation, graphics processor 109 processes graphics data from CPU 103 and places the processed signals into buffer store 110. These processed signals may be stored in buffer 110 in an all points addressable mode, in which each picture element to be displayed is represented, in the buffer, by digital data representing the color and intensity of that element. Alternatively, the buffer store may receive character data (either alphanumeric or graphic) which is subsequently decoded to provide the picture element data. Data is stored in the buffer at addresses defined by the CPU over bus 106. This data is subsequently read from the buffer by address signals from the CRT controller, passed to the video processor for any required conversion, and then applied over bus 114 to the monitor 102. Thus the data in buffer 110 is updated under the control of the CPU and transmitted to the monitor under the control of the CRT controller 108, which also provides the synch signals. CRT controller 108, as it is programmable, can control the display adapter to operate in different modes, such as the above mentioned all points addressable and character generator modes. In addition, it is programmed to determine the format of the synch pulses applied to the monitor.

Figure 2:
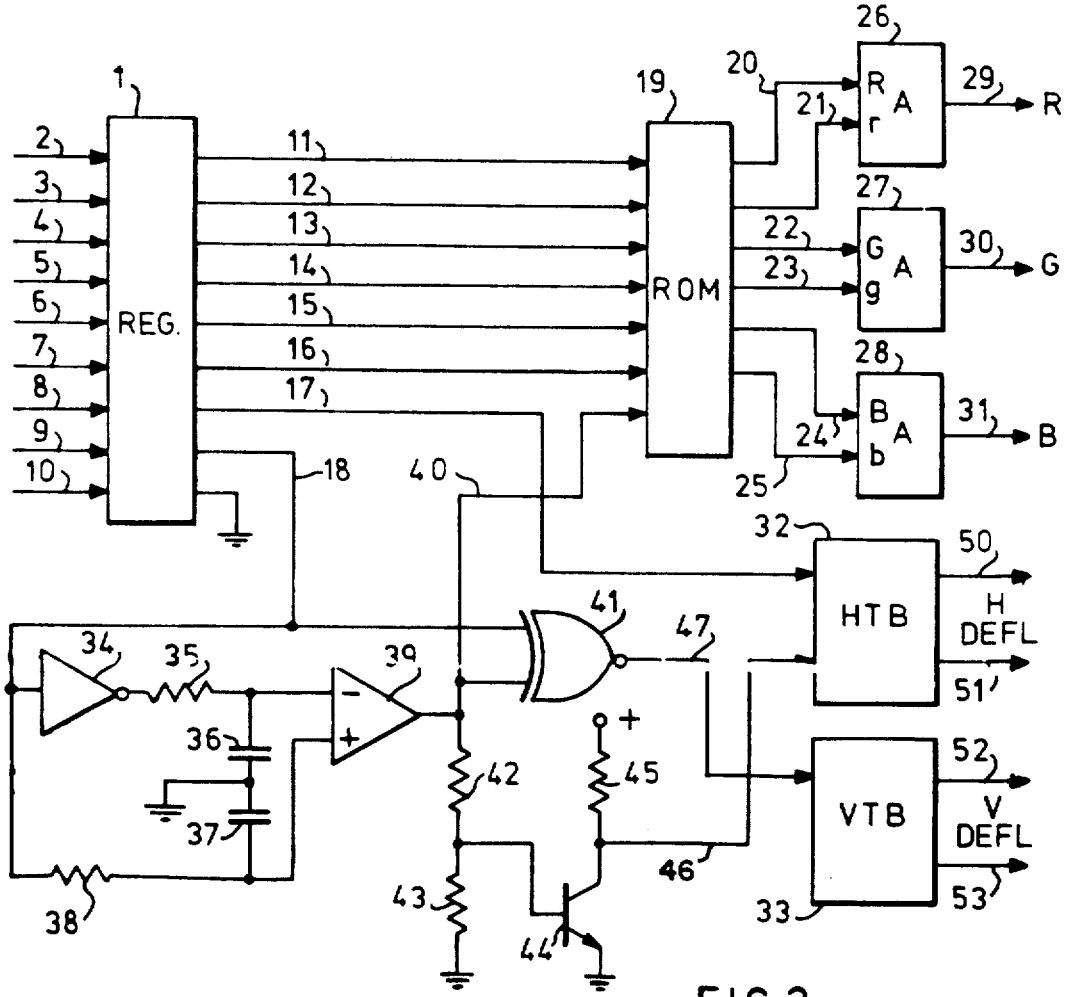
FIG. 2 is a diagram of the display monitor embodying the invention.

FIG. 2 shows, in simplified form, the major components of a digital video display monitor embodying the invention. The monitor includes a buffer 1 coupled to receive digital color signals on lines 2 through 7, horizontal synchronizing signals on a line 8 and earth potential on a line 10 which is also coupled to screen the lines 2 through 9 in a coupling cable. Color signal outputs from buffer 1 are applied, over lines 11 through 16, to logic means 19. Logic means 19 is shown as a read-only memory, but it may be any other type of logic device, for example a programmable logic array, which is adapted to perform the logic which will be described later.

In response to the input color signals, which, as well be seen later, will either be on lines 11 through 14 or on lines 11 through 16, logic means 19 generates digital color drive signals on lines 20 through 25. These signals are applied as inputs to video drive amplifiers 26 through 28 which respectively provide analog outputs to drive the red, green and blue guns of a color cathode ray tube (not shown) over lines 29, 30 and 31. Each of these amplifiers has an intensified color input (R, G and B) and a non-intensified color input (r, g, b) and can, therefore, generate any of four intensities depending on the values of the pair of digital inputs. Thus, the amplifiers together are capable of selecting 64 different color drives.

Referring back to register 1, output line 17 carries the horizontal synch signals. These are coupled to a horizontal time base generator 32 which provides horizontal deflection currents for the horizontal deflection coils of the CRT over lines 50 and 51. Vertical synch signals from register 1 are applied over line 18, through an exclusive NOR (XNOR) gate 41 and line 47, to a vertical time base generator 33 to drive the vertical deflection coils of the CRT over lines 52 and 53. As will be seen later, the purpose of XNOR 41 is to ensure that the polarity of the synch signals applied to time base generator 33 is constant irrespective of the polarity of these signals on line 18.

The vertical synch signals on line 18 are also applied to a control circuit which develops control signals for logic means 19, the time base generators 32 and 33, and XNOR 41 in accordance with the polarity of these synch signals. Line 18 is coupled, through an inverter 34 and integrator circuit comprising resistor 35 and capacitor 36, to the negative input of a differential amplifier 39. The positive input of differential amplifier receives the signals from line 18 uninverted but integrated by an integrator comprising resistor 38 and capacitor 37. The output of amplifier 39 provides control signals to logic means 19 and XNOR 41 over a line 40. These signals on line 40 are also applied, through a potentiometer network comprising resistor 42 and 43, to the base of NDN transistor 44. The collector of transistor 44 is coupled to a positive potential through resistor 45 and directly, over line 46, to a control input of the time base generator 32.

One example of the operation of the FIG. 2 system will now be detailed to assist in the understanding of the invention. The monitor system shown in FIG. 2 is, of course, adapted to present displays on the CRT in response to the digital signals received over lines 3 through 9. These signals are generated by a display adapter within a computer system as shown in FIG. 1 which assembles the digital data and provides sequences of this data for display. The primary object of the invention is to effect automatic switching within the monitor for different data formats. In the present example, two switched modes corresponding to two specific data formats will be described, though it will become clear later that switching between up to four modes could be achieved by modification of the FIG. 2 system. In the present example, in the first of the switched modes, MODE 1, the monitor is adapted to display 640×200 pels, each with any of 16 colors. In the second mode, MODE 2, the monitor is adapted to display 640×350 pels, each with any of 64 colors. In MODE 1, the monitor responds to positive horizontal and vertical synch pulses and to color signals on only four of the input lines, for example lines 2 through 5, in FIG. 2. In MODE 2, the monitor responds to positive horizontal and negative vertical synch pulses from the adapter and to color signals on all of the input lines 2 through 7 in FIG. 2. Thus it should be noted that the polarity of the synch pulses, generated by the display adapter of the computer, must correspond to the data format. If the adapter can provide a signal format suitable for MODE 1 only, then it is designed to provide positive synch pulses. If the adapter provides the MODE 2 signal format, then it generates positive horizontal and negative vertical synch pulses. With the automatic switching between modes, the monitor system of FIG. 2 can, therefore be coupled to either of these adapter types and operate without manual adjustment. Alternatively an adapter card may be able to switch between the data formats. An example of such an adapter would be one which can be switched between a low definition character generator operation, corresponding to MODE 1 in the monitor, and a high definition all points addressable operation corresponding to MODE 2 in the monitor. Alternatively, the adapter card could use character generation and all points addressable operations in both modes, with low definition in the first mode and high definition in the second mode. With such a switchable adapter, it is clear that reversal of the polarity of the vertical synch pulses can be easily achieved during switching. In order to display the 640×200 pels in MODE 1, the vertical time base frequency is set to 60 Hz, the horizontal to 15.7 kHz. In this mode the horizontal time base width control is set to overscan the CRT and to adjust for the difference in the aspect ratio of the display data between the two modes. In MODE 2, the vertical time base frequency remains at 60 Hz, the horizontal time base frequency is set to 22 kHz and the width is set for normal scan.

Figure 3:
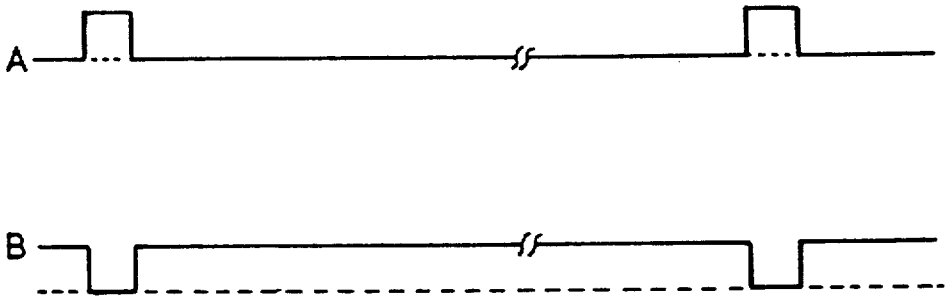
FIG. 3 is a waveform diagram showing synchronizing signals applied to the monitor of FIG. 2 from the display adapter shown in FIG. 1.

Referring back to FIG. 2, the input signals on lines 2 through 9 are passed through buffer 1 to the logic means 19, the horizontal time base 32, and, over line 18, the vertical synch signals are applied to XNOR gate 41 and to inverter 34. In MODE 1, the synch signals are positive, as shown at waveform A of FIG. 3. Inverter 34 provides an output signal the inverse of waveform A, that is, a signal with a normally high level which drops during each synch pulse. This output signal is applied to the integrator, comprising resistor 35 and capacitor 36, which has a time constant considerably longer than the period of each synch pulse. Thus, a substantially constant high level signal is applied from the integrator to the negative input of differential amplifier 39. At the same time, the uninverted signal of waveform A of FIG. 3 is applied to the integrator comprising resistor 38 and capacitor 37, which is similar to integrator 35, 36. Thus, a substantially constant low level signal is applied from integrator 38, 37 to the positive input of differential amplifier 39. In response to these inputs, differential amplifier 39 provides a substantially constant low level output. This low level output is applied over line 40 to XNOR gate 41 which, therefore inverts the positive synch pulses applied to its other input to provide negative synch pulses to vertical time base generator 33. The low output on line 40 is coupled to logic means 19, for the purpose to be described below, and, through network 42, 43, to transistor 44. This transistor is therefore set to a low current level, so a positive potential through resistor 45 is applied to line 46. This line is coupled within time base generator 32 to electronic switches which are set by the positive potential on the line. When set, these switches couple frequency determining and width determining components into the time base to set it to 15 kHz and overscan as required for MODE 1.

In MODE 2, the vertical synch pulses on line 18 are negative, as shown at waveform B of FIG. 3. Thus, inverter 34 applies a normally low level output, which rises for each synch pulse, to integrator 35, 36. This integrator therefore delivers a substantially constant low level signal to the negative input of integrator 39. The uninverted waveform B is applied to integrator 38, 37 to provide a substantially constant high level signal to the positive input of differential amplifier 39. The output of this amplifier, in response to these input signal levels, is a substantially constant high level. This is applied, over line 40, to XNOR gate 41 so that the negative going synch pulses applied to the other input of this gate pass through the gate uninverted. The vertical time base generator, therefore, still receives negative going synch pulses over line 47. Now, however, the signal level on line 40 applied to logic means 19 is high, the effect of which will be described later. This high level is also applied through network 42, 43 to cause transistor 44 to conduct heavily, bringing the potential on line 46 near to zero. This resets the electronic switches in the horizontal time base generator 32 to cut out the above mentioned frequency and width determining components for MODE 1 and bring in further such components to set this time base to 22 kHz and normal scan width. Thus, the system, as so far described, automatically switches the CRT deflection system to allow for the different modes in accordance with the polarity of the vertical synch signals while providing common polarity synch signals for the vertical time base generator in both modes.

As has been mentioned above, line 40 from differential amplifier 39 is also applied as an input to logic means 19. It will be recalled that this line is set to a low level in MODE 1 and a high level in MODE 2. In MODE 1 the color signals from the adapter arrive over lines 2 through 5. These signals may represent intensity, red, green and blue (I.R.G.B.) digital signals on the respective lines to provide 16 colors on the C.R.T. In MODE 2 six lines, 2 through 7 carry respectively high intensity red, red, high intensity green, green, high intensity blue, and blue (RrGgBb) digital signals to provide 64 colors. In MODE 1 the extraneous lines, that is lines 6 and 7 may either be earthed at the adapter or provide 'don't care' inputs to logic means 19.

In MODE 2, logic means 19 responds to the high level on line 40 by gating the signals from register 1 over lines 11 through 16 directly to the corresponding RrGgBb inputs to amplifiers 26 through 28 over lines 20 through 25.

In MODE 1, the low level on line 40 is applied to logic means 19. This causes logic means 19 to decode the IRGB signals on lines 11 through 14 from register 1 as follows:

| I | R | G | B | Rr | Gg | Bb | Color |
|---|---|---|---|---|---|---|---|
| 0 | 0 | 0 | 0 | 00 | 00 | 00 | Black |
| 0 | 0 | 0 | 1 | 00 | 00 | 10 | Blue |
| 0 | 0 | 1 | 0 | 00 | 10 | 00 | Green |
| 0 | 0 | 1 | 1 | 00 | 10 | 10 | Cyan |
| 0 | 1 | 0 | 0 | 10 | 00 | 00 | Red |
| 0 | 1 | 0 | 1 | 10 | 00 | 10 | Magenta |
| 0 | 1 | 1 | 0 | 10 | 01 | 00 | Brown |
| 0 | 1 | 1 | 1 | 10 | 10 | 10 | White |
| 1 | 0 | 0 | 0 | 01 | 01 | 01 | Gray |
| 1 | 0 | 0 | 1 | 01 | 01 | 11 | Light blue |
| 1 | 0 | 1 | 0 | 01 | 11 | 01 | Light green |
| 1 | 0 | 1 | 1 | 01 | 11 | 11 | Light cyan |
| 1 | 1 | 0 | 0 | 11 | 01 | 01 | Light red |
| 1 | 1 | 0 | 1 | 11 | 01 | 11 | Light magenta |
| 1 | 1 | 1 | 0 | 11 | 11 | 01 | Light yellow |
| 1 | 1 | 1 | 1 | 11 | 11 | 11 | High Intensity & White |

Thus, in MODE 1, logic means 19 decodes the four parallel input signals to apply a selection of 16 of the possible 64 drive combinations to amplifiers 26 through 28. In MODE 2, logic means effects a straight gating operation to pass the six parallel input signals directly to amplifiers 26 through 28. As in the case of the time base control the chosen operation is selected in accordance with the polarity of the vertical synch signals received from the adapter. As indicated in FIG. 2, logic means 19 comprises a read-only memory, but it may be in the form of a programmable logic array device. Suitably programming either of these devices to perform the logical operations defined above would present no difficulty to one skilled in the art. Alternatively, logic means 19 could be implemented by tristate gates or multiplexers and simple switching logic.

Figure 4:
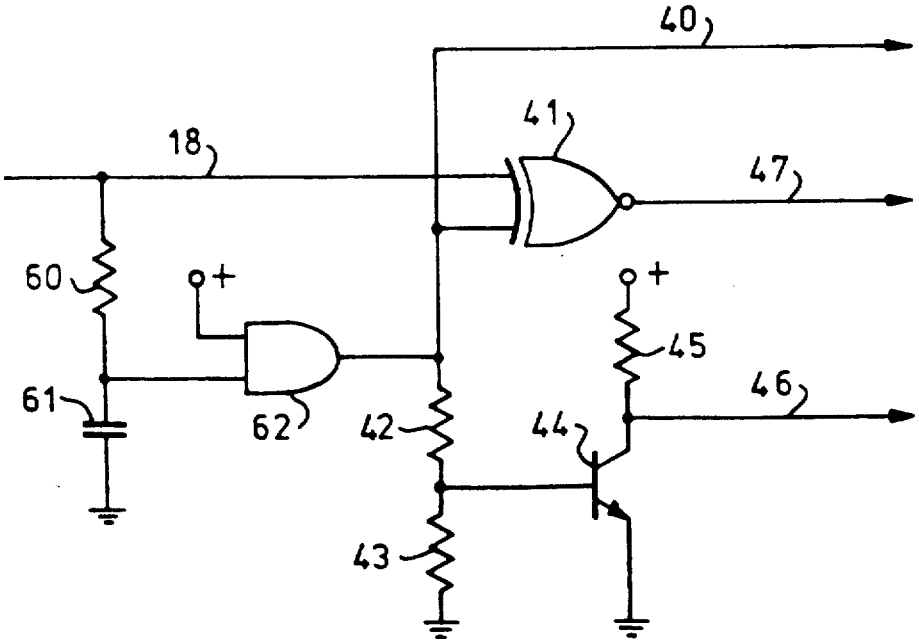
FIG. 4 shows a modification of the monitor control circuit in FIG. 2.

The components 34 through 47 in the control circuit of FIG. 2 may be replaced by other circuitry performing the same function. One other form of this control circuit is shown in FIG. 4. There, the vertical synch pulses are applied to a single integrator comprising resistor 60 and capacitor 61. This integrator is similar to those in FIG. 2, and has a long time constant compared with the period of the synch pulses. The integrator output is applied to one input of an AND gate 62, the other input of which is coupled to a constant positive level. Thus, when the vertical synch pulses are high, as shown at A in FIG. 3, the integrator output is low, so the output of AND gate 62 is low. With the low synch pulses shown at B in FIG. 2, the output of the integrator is high, so the output of AND gate 62 is high. Accordingly, as with the FIG. 2 system, the FIG. 4 system provides a substantially constant low output on control line 40, a high output on line 46 and negative vertical synch pulses on line 47 in response to the positive synch pulses of waveform A of FIG. 3 appearing on line 18. In response to the negative vertical synch pulses, line 40 goes high, line 46 goes low, and the synch pulses on line 47 still remain negative. Alternatively, AND gate 62 could be replaced by a single input threshold switching buffer device to provide the same outputs on line 40.

It is clear that, with the systems shown in FIGS. 2 and 4, if the vertical time base generator requires positive synch pulses this can easily be achieved by replacing XNOR 41 by an exclusive OR gate.

Whilst in the systems shown in FIGS. 2 and 4, switching between only two modes has been shown, it will be evident to one skilled in the art that switching between up to four modes can be achieved by looking at combinations of the polarity of both the horizontal and vertical synch signals. Thus, by expanding the control circuitry to be responsive to the polarity of both synch signals, up to four horizontal time base frequencies could be selected. In addition, by also controlling the vertical time base frequency, the four modes could encompass various display formats with widely varying displays. Furthermore, by the use of two control lines to the color logic means, line structures of up to four differing color signal formats could be used.

While the invention has been described by reference to specific embodiments, it will be clear to persons skilled in the art that various other modifications in form and detail may be made without departing from the spirit and scope of the following claims.

We claim:

1. A digital display system including a computer display adapter for generating color signals, in parallel form and horizontal and vertical synchronizing pulses, and a display monitor for generating a raster scan display on a cathode ray tube in response to said signals and pulses, said monitor including control circuit means responsive to positive-going and negative-going vertical synchronizing pulses for providing first and second control signals respectively, and a horizontal time base generator coupled to receive said control signals for operation at first and second frequencies in response respectively to said first and second control signals whereby the line structure of the raster scan display varies in accordance with the polarity of vertical synchronizing pulses generated by said adapter.

2. A digital display system according to claim 1, including a plurality of lines for coupling said color signals from the adapter to the display monitor, said adapter generating said color signals selectively as first groups on all, or as second groups on some, but less than all, of said lines, with the polarity of generated vertical synchronizing pulses varying in correspondence with the groups, in which said monitor includes logic means receiving said plurality of lines, having a like plurality of output lines and having a further input line for receiving outputs from said control circuit means indicative of the polarity of received vertical synchronizing pulses, said logic means being responsive to said outputs to pass said first groups of color signals to said output lines unchanged and to encode the second groups into signals on all the output lines.

3. A digital display system according to claim 2 in which said logic means comprises a read only memory.

4. A digital display system including a display monitor coupled to receive parallel digital color signals and horizontal and vertical synchronizing pulse trains from a computer display adapter to develop a raster scan display on a cathode ray tube, comprising control circuit means in the monitor, responsive differentially to positive-going and negative-going vertical synchronizing pulse trains to generate respective control signals for switching the frequency of horizontal time base generator means and thereby altering the line structure of the display.

5. A digital display system according to claim 4, comprising a plurality of signal lines for carrying said parallel digital signals and logic means having inputs coupled to said lines, a further input for receiving control signals from said control circuit means and output lines corresponding to said signal lines and switchable in response to sets of parallel digital signals on all the signal lines accompanied by first control signals to direct the sets of parallel signals to the output lines unchanged and in response to sets of parallel digital signals to some, but less than all, the signal lines and accompanied by second control signals to encode the sets of parallel signals for generating corresponding sets of output signals on all the output lines.

6. A digital display system according to claim 4, comprising means for coupling control signals from said control circuit means to width control means in said horizontal time base generator to switch the width of said raster scan display in response to said control signals.

7. A digital display system according to claim 4, comprising further logic means receiving said vertical synchronizing pulses and said control signals to develop vertical synchronization pulses of fixed polarity for input to vertical time base generating means.

8. A digital display system according to claim 7, in which said further logic means consists of an exclusive NOR circuit.

*9. A digital display system comprising:*

*a digital data processor operable to develop data sets of more than one video display format for display, said digital data processor further operable to generate horizontal and vertical synchronizing signals, at least one of said horizontal and vertical synchronizing signals having positive-going pulses and negative-going pulses wherein the positive-going pulses correspond to a first video display format and the negative-going pulses correspond to a second video display format, and;*

*a monitor, said monitor including a raster scanned cathode ray tube, said monitor further including a circuit responsive to the positive-going and the negative-going pulses to display a video display format corresponding to the positive-going pulses and the negative-going pulses.*

*10. The digital display system of claim 9 wherein both horizontal and vertical synchronizing signals have positive-going and negative going pulses and up to four different video display formats may be displayed.*

*11. The digital display system of claim 9 wherein the first video display format has a different scanning frequency from the second video display format.*

*12. The digital display system of claim 11 wherein said scanning frequency is the horizontal scanning frequency.*

*13. The digital display system of claim 11 wherein said scanning frequency is the vertical scanning frequency.*

*14. The digital display system of claim 9 wherein a first video display format is a character generator format and a second video display format is an all-points-addressable format.*

*15. The digital display system of claim 9 wherein each video display format has a different video signal format.*

*16. The digital display system of claim 15 wherein a first video signal format comprises a color signal of a first format and a second video signal format comprises a color signal of a second format.*

*17. A monitor for a display system in which a plurality of video display formats may be displayed and wherein each video display format has vertical and horizontal synchronizing signals, and wherein at least one of the horizontal and vertical synchronizing signals has positive-going and negative-going pulses the positive-going pulses corresponding to a video display of a first format and the negative-going pulses corresponding to a display format of a second video format which comprises:*

*a raster scanned cathode ray tube and a circuit responsive to the positive-going and negative-going pulses to display formats on said cathode ray tube, said monitor further including a circuit responsive to synchronizing signal positive-going and negative-going pulses to switch said video display format to the format corresponding to the positive-going and negative-going pulses.*

* * * * *